July 26, 1932.  C. F. GODDARD  1,868,895
ROAD MAINTENANCE EQUIPMENT
Filed Dec. 19, 1930   3 Sheets-Sheet 3
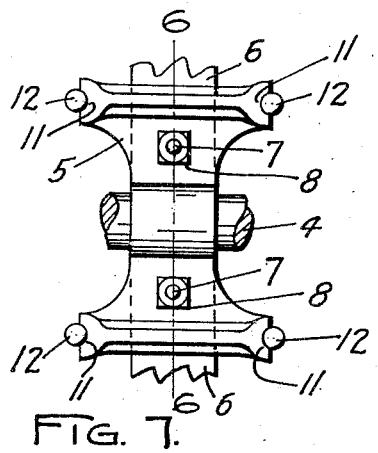
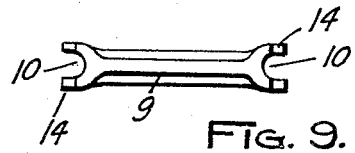
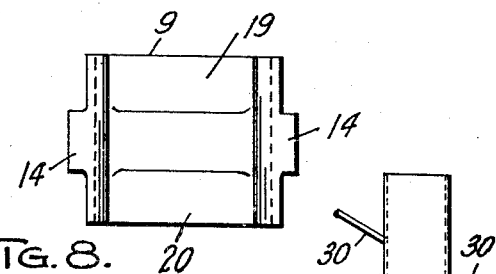
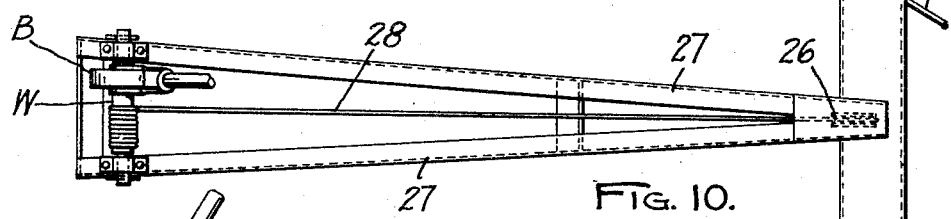
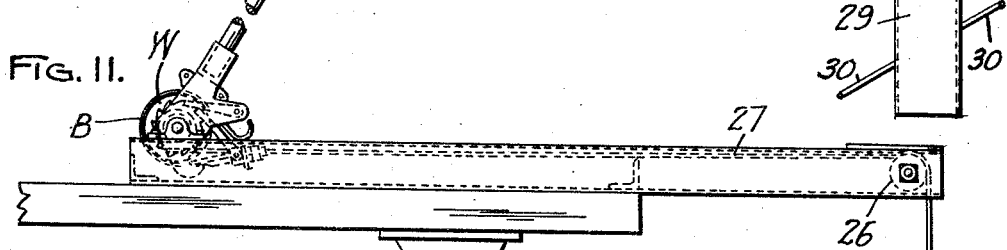
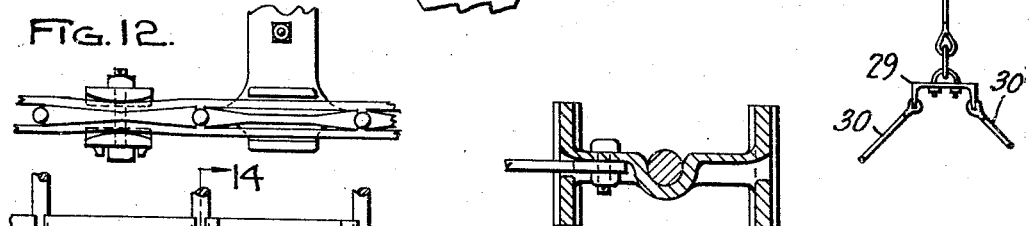
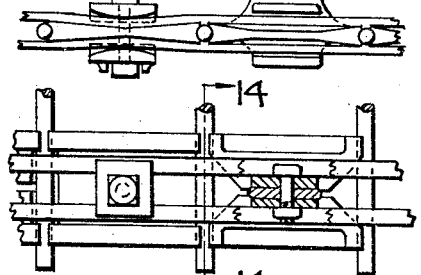
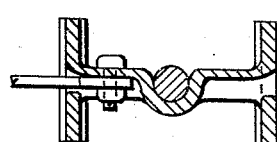
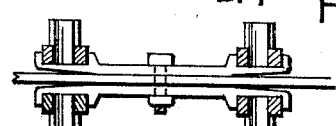
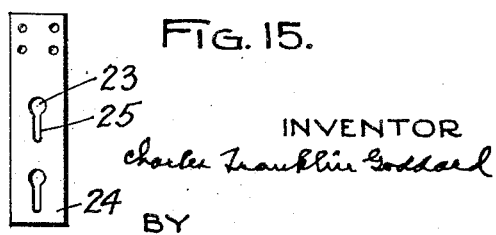
INVENTOR
Charles Franklin Goddard
BY
Rolland L. Trott
ATTORNEY.

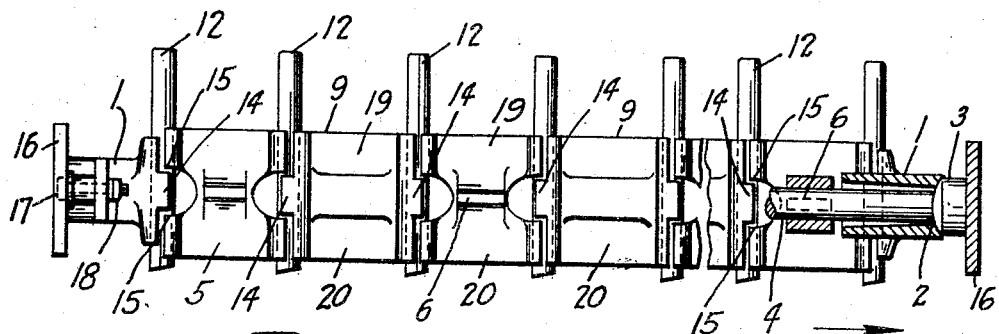
FIG. 2.
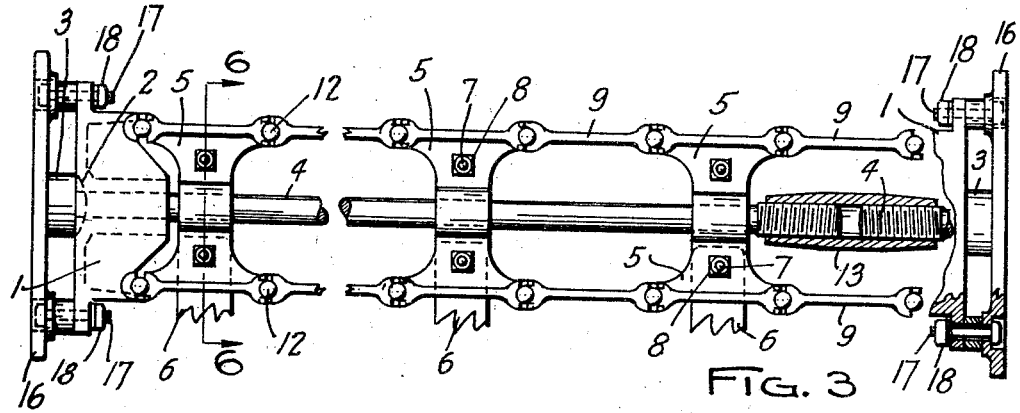
FIG. 3.
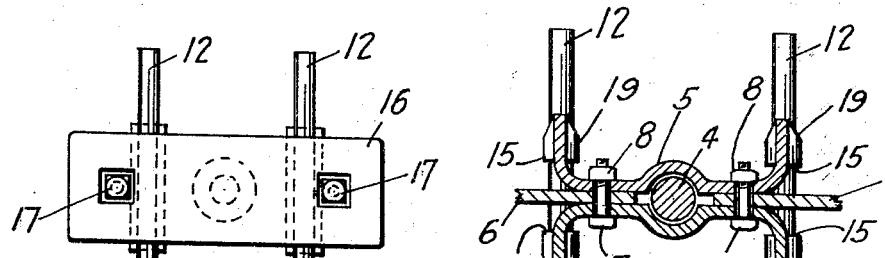
FIG. 4.
FIG. 6.
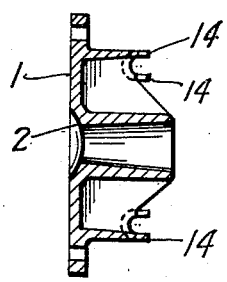
FIG. 5.

Patented July 26, 1932

1,868,895

UNITED STATES PATENT OFFICE

CHARLES FRANKLIN GODDARD, OF LOS ANGELES, CALIFORNIA, ASSIGNOR TO THE AUTOMOBILE STORAGE ELEVATOR COMPANY, OF DENVER, COLORADO, A CORPORATION

ROAD MAINTENANCE EQUIPMENT

Application filed December 19, 1930. Serial No. 503,454.

My invention pertains to road maintenance equipment, and is in part, an improvement over my former invention, application for Letters Patent on which was filed March 25th, 1930, the serial number being 438,792, now Patent No. 1,829,591.

Roads when constructed are generally "crowned", that is, they are made slightly higher toward the center, in order to shed water. The degree of crown, however, varies with service and weather conditions, so that any maintenance device is required to operate on roads of almost constantly changing contour. The action of any blade grader used to form the original crowned surface is such that shallow chatter marks are left in the road surface. These chatter marks are deepened and enlarged by traffic until the road becomes deeply corrugated transversely and very rough to travel at ordinary road speeds. Such a road is commonly called "washboard". The original crown of the road has a tendency to disappear with use. Both the corrugations and the reductions of crown with use are apparently due to the fact that when the road is wet a tire moves the material sidewise, not longitudinally, and when the road is dry the effect is the same, though to a less degree. Once a corrugation is formed, the drop of a tire into the depression produces a certain sidewise displacement of material tending to deepen the depression. Since there is little traffic along the extreme edges of a road the material moved to the edge from the center has little chance of being moved back to the center again by traffic. Thus, the crown is gradually reduced with use of the road. The material moved to the edges serves no useful purpose and may even when deep become a hazard to fast moving vehicles. The reduction of the crown also destroys the drainage of the surface, causing the road surface to retain rather than shed water. This sidewise movement of the upper layers of the road surface also tends to expose any rocks or stones that may have been in the material with which the road was surfaced.

After a rain there is a certain short period during which the material of the road is in proper condition for quick and effective re-conditioning, after which it becomes gradually too dry for satisfactory working.

From all the above considerations it can be seen that road maintenance equipment is valuable almost in direct proportion to its ability to maintain the road crown, remove the corrugations or "washboard" and the stones, and operate at a high speed so that a great amount of road may be re-conditioned during the short time after each rain that it is in just the right working condition.

It is the object of this invention, therefore, to provide road maintenance equipment which will remove the irregular high spots of the road, move the loosened fine material laterally upon the road (generally toward the middle of the road), fill up the smaller depressions with the loosened fine material while conforming to the general transverse profile, and which, because of its general design and rugged construction may be moved at relatively high speed upon the road without injury to the device and without detracting in any way from the results obtained.

A further object is to provide means for the quick and easy lifting of the road file itself from the road for passage over railroad tracks, bridges, concrete culverts, or roads, or imbedded rock masses.

A further object is to provide a road maintenance device in which wear is restricted almost entirely to easily adjustable and replaceable teeth which may be reset or replaced after wear with a minimum of time and labor.

A further object is to provide a road maintenance device tool which may be used with either end forward and with either side up.

A further object is to provide a road maintenance device in which the same effect as sharpening the teeth may be obtained when the teeth have been worn, by turning the device end for end, so the sharp ends of the teeth formed by the bevel of wear will then be at the front of the teeth.

A further object is to provide a road maintenance device in which all the wearing portions of the castings may be worn out by turning the device upside down, after the wearing portions of the castings have been sufficiently worn on one side.

A further object is to provide such a tool having the minimum waste of the wearing material, requiring little machine work, and in which the various members are simple and may be easily and cheaply replaced.

I attain the above objects by providing a road file construction composed of longitudinally rigid toothed sections joined by springs to give transverse flexibility, each section having transverse ends or blades which with those of the other sections form stone removing and road leveling means; each section having longitudinal blades in which are clamped vertically adjustable teeth, and which with those of the other sections form means to move the loosened fine material laterally; each blade being composed of cooperating longitudinally disposed parts, with adjacent parts clamping upon vertical pins to form the toothed blades, and each pair of blades provided with longitudinal bolts clamping the parts of the section together, and by providing haulage, and raising and lowering means to be carried by a tractive vehicle.

All of the above is described more in detail below and is illustrated in the drawings, in which:

Figure 2 is a side elevation of Figure 1, partially in section.

Figure 3 is a plan view of a single unit of my road file, partially in section.

Figure 4 is an end elevation of Figure 3.

Figure 5 is a detail of the end piece.

Figure 6 is a detail, partially in section, showing the two parts of the guide piece, clamping bolts, springs, and teeth.

Figure 7 is a plan view of Figure 6.

Figure 8 is a detail showing the spacer piece.

Figure 9 is a plan view of Figure 8.

Figure 10 is a plan view of the support mechanism, including hoist and lowering device.

Figure 11 is a side elevation of Figure 10.

Figures 12, 13, 14 and 15 are views of detailed modifications of the road file construction.

Figure 16 is a view of the drag bar.

Figure 1:
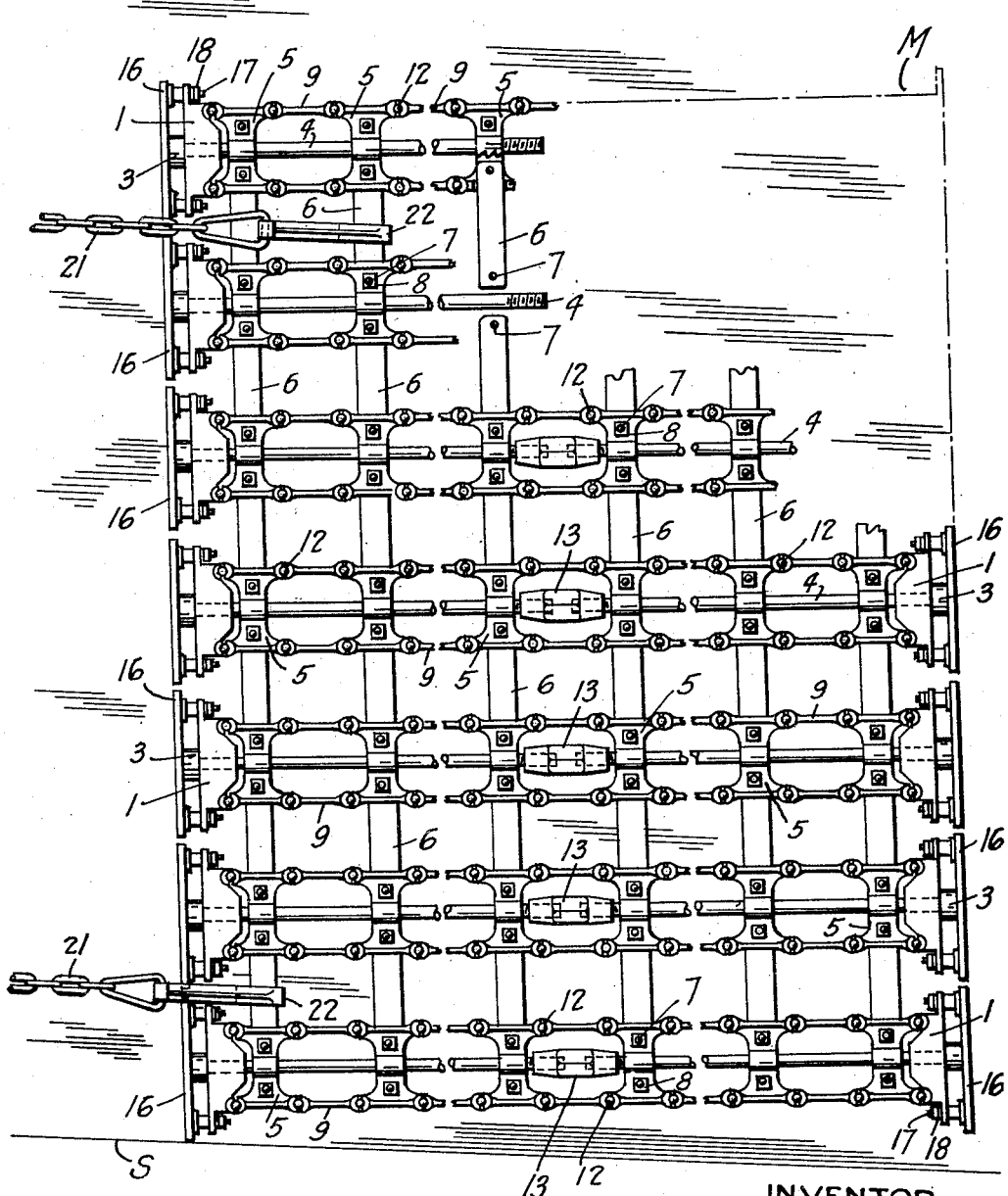
Figure 1 is a fragmentary plan view showing a seven unit road file and drag chains.

The end pieces 1 are provided with the sockets 2 for the reception of the heads 3 of the clamping bolts 4, one of each pair having right hand threads, the other having left hand threads. The guide pieces 5 are clamped together upon the tie springs 6 by the clamping bolts 7 and nuts 8. The guide pieces 5 also clamp about, but not upon, the clamping bolts 4, there being enough clearance with the bolts 4 to permit the clamping pressure to be taken by the springs 6. The spacer pieces 9, as well as the guide pieces 5, are provided with the clamping seats 10 and 11, respectively, which seats receive the teeth 12, and which assemblies form the longitudinal blades.

The clamping nuts 13 are provided with both right and left hand threads, so they may draw the clamping bolts 4 together and thus through the sockets 3 of the end pieces 1, subject both of the entire assembled lines of guide pieces, spacer pieces and teeth to the same clamping pressure. The ball and socket connection between the bolts 4 and the head pieces 1 insures equal clamping pressure upon the two lines of guide pieces, spacer pieces and teeth which form the two toothed blades of each unit.

The spacer pieces 9 and the end pieces 1 are provided with the tongues 14 which fit between the shoulders 15 of the guide pieces 5, and thereby maintain the vertical alignment of the spacer pieces and end pieces. The free fit of the guide pieces 5 upon the bolts 4 limits the amount of either vertical or horizontal buckling that can take place when the clamping nuts 13 are tightened up. Each end piece 1 is clamped to the end plate 16 by the clamping bolts 17 and nuts 18. The unit thus formed of clamped together parts is rigid, and the only parts machined at all are the clamping bolts and nuts used in its assembling. It will be noted that both spacer pieces 9 and guide pieces 5 are provided with the thickened upper and lower wearing edges 19 and 20 respectively, and act as longitudinal blades.

The unit, therefore, will work equally well when dragged in either direction, and with the teeth set to contact the road adjacent either the upper or lower edges 19 and 20. Contact with the road wears the teeth as shown in Figure 2, when the device is moved in the direction indicated by the arrow. Turning the device end for end, will therefore, bring the sharp ends of the bevel ended worn teeth to the front, giving exactly the same result as sharpening the teeth.

Turning the device upside down may be employed for the complete wear of both wearing edges 19 and 20, of the castings, so that there will be as little loss as possible when replacement of castings is finally required.

Adjacent units are joined by the springs 6 which permit the necessary slight flexibility between units so the assembled road file will conform, at least to some extent, to the crown or other large transverse irregularities of the road. The longitudinal rigidity of each unit prevents the road file from conforming to the small longitudinal irregularities of the road.

The road file will ordinarily operate for many miles before the teeth are worn so close to the blades that they must be adjusted downward. When this becomes necessary, the road file is raised from the road, as will be described hereinafter, and the teeth are driven downward with a hammer. Due to the fact that the construction insures all teeth being subjected to the same clamping pressure between the seats 10 and 11 of the spacer and guide pieces respectively, this method of adjustment of the teeth provides surprisingly uniform adjustment. The workman soon learns to give the hammer the same swing for each blow, and one good blow is enough to move a tooth downward the required amount.

The clamp of the seats upon the teeth, however, is enough to prevent any vertical movement of the teeth during operation upon the road. When a tooth is worn so it is flush with both top and bottom of the blade, a new tooth is used to drive the old tooth downward the required distance, leaving the new tooth clamped in place between the adjacent seats by a part of its length. By this method very little of the old tooth is wasted since it is driven downward till it is too short to be securely held between the seats during contact with the road. By this hammer method of tooth adjustment, all the teeth of the road file may be properly adjusted in a few minutes by a man who has done it a few times and knows the exact method of procedure.

The road file is to be dragged over the road at a slight angle to the line of draft, which angle is to be varied to suit conditions of the road, as well as the speed at which the road file is dragged. As the road file moves along the road, the end plates 16 strike, and remove to the side of the road, the rocks or stones that are loose upon the road surface. Embedded rocks or stones which are loosened by the teeth, are with the finer materials moved slightly inward toward the center of the road by the angle of the blades, but the end plates 16 at the rear end of the road file tend to move the loosened rocks and stones toward the side of the road, the same as the end plates 16 at the front end of the road file. When excess of loose road material piles up against the rear end plates 16, this outward movement of the loosened stones and rocks is obstructed to a greater or less extent, but the tendency is of course still present due to the angle of the plates 16.

As the road file moves along the road it may carry with it quite a large amount of material as long as the road is smooth and with considerable loose gravel on its surface. But, when a rut, hole, or other depression is met with, this collected gravel or material is at once dropped, and the rear plates 16 act as a leveler, so that the road surface in any case, after the road file has passed over it, is smooth and even. Much of the loose material collected and carried along by the road file may come from the chips removed from the high spots of the road by the teeth 12.

When the excess road material piles up high enough against the rear end plates 16, it is discharged over the top of these plates and upon the road surface to the rear, and with this material passes the loosened stones and rocks which have been unable to pass transversely to the side of the road along the front faces of the rear end plates 16. This discharge of material over the end plates 16 limits the amount of excess material that can be carried along by the road file.

While ordinary road equipment moves at a rate of around three miles an hour, my road file has on a corrugated or washboard road made smooth road at the rate of 25 miles an hour. This, of course, may not always be possible, because of road condition or material. Also, the truck with which such speed is made possible is of special construction and is provided with a 125 horse power engine, with the other design features of the truck in proper keeping therewith.

But, from this it can be seen that my road file is of very great utility not only because of the extraordinary fine road it makes, but also from the fact that with only one man to operate the equipment it will maintain from five to ten times as much road as the ordinary present day equipment makes, when using two men. My road file may also be run day and night, since no adjustment is required during its operation, and daylight is not necessary. As the road file is dragged at a slight angle to the road, this leaves the corners S and M at the side and middle of the road. It is this, probably combined with the speed of travel, that thins out the collected fine material toward both the side and the center of the road, leaving no windrow or ridge whatever. So, the road when once passed over, needs no further attention till the next time it is worked and no extra trips to spread the windrows of loose road material are required. Most road equipment used at present leaves a windrow, which must be spread by relatively idle trips not needed when my road file is used.

The drag chains 21 are provided with the hooks 22 each of which hooks over a spring 6. The chains 21 pass through the holes 23 in the drag bars 24 and at the proper length one link of each chain is moved from the hole 23 to the slot 25. The drag bars 24 are to be properly attached to the tractor vehicle.

The angle of the road file with the road is set as desired by this adjustment of the relative lengths of the chains at the drag bars. Over ordinarily good roads the chains 21 may be fairly long. If, however, the road is rough, or has sudden rises into which the end plates 16 might dig too deeply, the chains may be shortened till they are nearly vertical, so that the front end of the road file will be raised by the upward movement of the truck in passing over a hummock or other sudden rise in the road. In some cases it may be found that best results can be obtained by attaching the hooks 22 to the first springs back of the end pieces 1. In other cases it may be found best to attach the hooks 22 to the second, third or fourth springs from the end pieces 1. Or one hook 22 may be attached to the first spring, while the other may be attached to a spring further removed from the end piece 1. In other words, the chains, the hooks, the springs and the drag bars combine to afford a great variety of hitches from which can be selected the proper hitch for any particular set of conditions. For instance, if the road has no crown, and it is desired to keep it perfectly flat, then, on alternate passages of the road file over the road in question the angle with the line of draft may be changed, so that the lateral movement of the fine material on the road surface will be first toward the center of the road, and next away from the center of the road. Or for several passes over the road the file may be set at such a slight angle that each tooth of a blade is only offset enough so that it does not directly follow the tooth in front of it, and then on a single passage over the road the file may be set at a steeper angle in the other direction. Thus the amount of crown or the degree of flatness desired may be maintained.

The pulley 26 is journaled upon the framework 27 which framework is to be mounted upon a truck or other tractive vehicle.

The winch W, which may be either hand or power operated is mounted upon the framework 27 and carries the cable 28 which passes through the pulley 26 and is attached to the cross bar 29. The cross bar 29 is attached by the cables 30 to the road file. Operation of the winch W raises the road file from the road, and its release permits it to be lowered slowly by means of the brake B to the road surface again. When in operation the cables 30 are to be loose enough to permit free action of the road file over the road.

I am well aware that the details of construction of my road file may be subject to considerable variation without departing from the essence of my invention since they would come under the head of mechanical equivalents, so I do not wish to limit my protection narrowly to the exact set of details of construction shown and described, but what I claim as new, and desire to protect by Letters Patent, is as follows:

1. In a road maintenance device, units composed of parallel longitudinally extending rigid toothed blades and a plurality of resilient means joining the units to form a resilient transversely flexible assembly.

2. In a road maintenance device, units composed of longitudinally extending rigid, substantially parallel, toothed blades and means including spring members bolted in place joining the units to form a resilient transversely flexible assembly.

3. In a road maintenance device, units composed of parallel longitudinally extending rigid toothed blades and resilient means joining the units to form a resilient transversely flexible assembly.

4. In a road maintenance device, units composed of blade and tooth members clamped in a line together to form longitudinally rigid toothed blades, and resilient means joining the units to form a transversely flexible assembly.

5. In a road maintenance device, longitudinally rigid units composed of end pieces, guide pieces, spacer pieces, teeth, and clamping means mounted in said end pieces and upon which said guide pieces are guided and which clamp the said pieces and teeth together and means joining the units together to form a transversely flexible assembly.

6. In a road maintenance device, longitudinally rigid units composed of end pieces, guide pieces, spacer pieces, teeth, and clamping means mounted in said end pieces and upon which said guide pieces are guided and which clamp said pieces and teeth together, and means including transversely extending springs, joining the units together.

7. In a road maintenance device, parallel longitudinally extending rigid units and transversely extending springs rigidly attached to and joining adjacent units.

8. In a road maintenance device, units composed of parallel longitudinally extending rigid blades having substantially vertical teeth, and transverse springs rigidly attached to and joining adjacent units.

9. In a road maintenance device, units composed of longitudinally rigid blades having substantially vertical teeth and having transverse blades at each end, and transverse springs joining adjacent units.

10. In a road maintenance device, units composed of longitudinally rigid blades having substantially vertical teeth and having transverse blades at each end, the units being joined together to form a transversely flexible assembly.

11. In a road maintenance device, units composed of members having similar top and bottom construction, teeth to be clamped between adjacent members in a vertical position, means to clamp the members together to form a rigid unit, and springs attached to the units to form a transversely flexible assembly.

12. In a road maintenance device composed of flexibly connected units, a unit construction composed of two rows of blade pieces and teeth, and end pieces at each end of said rows and clamping means intermediate the two rows and engaging the endpieces, whereby equal clamping pressure may be put upon all the pieces and teeth of boths rows.

13. In a road maintenance device, a toothed blade composed of substantially vertical teeth, members having teeth fitting seats between and acting to space adjoining teeth, and means to clamp the members and the teeth together and limiting the amount of buckling of the clamped together parts.

14. In a road maintenance device, a blade composed of a plurality of separated aligned elements and a plurality of substantially vertical teeth disposed between adjoining separated elements, and clamping means to clamp the teeth and the elements together to form a blade unit.

15. In a road maintenance device, a toothed blade composed of aligned substantially vertical teeth and aligned co-acting parts disposed between adjoining teeth and means frictionally maintaining the relative positions of said parts and teeth.

16. In a road maintenance device sections composed of blade elements and frictionally held substantially vertical teeth carried between adjoining elements, and means connecting a plurality of said sections.

17. In a road maintenance device, blade elements and frictionally held substantially vertical teeth carried clamped between adjoining elements to form blades and means connecting a plurality of blades to form a drag adapted to be pulled over the surface of a road.

18. In a road maintenance device, longitudinally extending units longitudinally rigid and provided with aligned blade and tooth members and resilient means rigidly attached to and joining the units to form a transversely flexible assembly.

19. In a road maintenance device, units longitudinally rigid and having aligned blade and tooth members and resilient means joining the units to form a resilient transversely flexible assembly of substantially parallel longitudinally extending toothed units.

20. In a road maintenance device, units longitudinally rigid and provided with aligned blade and tooth members and resilient means joining the units to form a resilient transversely flexible assembly of longitudinally extending units.

21. In a road maintenance device, units composed of aligned blade and tooth members forming longitudinally rigid blades provided with cooperating teeth and resilent means joining the units to form a resilient transversely flexible assembly.

22. In a road maintenance device, longitudinally extending toothed units composed of longitudinally rigid blades and aligned substantially vertical teeth carried thereby, and transverse springs rigidly attached to and joining adjacent units.

23. In a road maintenance device, units composed of longitudinally rigid blades having substantially vertical teeth and having transverse members at each end, and transverse springs joining adjacent units.

24. In a road maintenance device, units composed of longitudinal blades having substantially vertical teeth and having transversely extending members at each end, the units being joined together to form a transversely flexible assembly.

25. In a road maintenance device, a plurality of blade elements, a plurality of substantially vertical teeth aligned with said elements, and clamping means whereby the teeth are carried clamped between adjoining blade elements to form a blade.

26. A road maintenance device having two laterally effective blades joined by a plurality of longitudinally effective toothed blades producing selective action whereby large particles are moved in one direction and small particles in another direction.

27. In a road maintenance device a plurality of units flexibly joined, each unit having substantially vertical longitudinal toothed blade members and transverse leading and lagging blade members whereby small particles are moved in one direction by the longitudinal blade members and large particles are moved transversely thereto by the transverse blade members.

28. A road maintenance device comprising a plurality of units flexibly joined, each unit having substantially vertical teeth and longitudinal and transverse blade members whereby the teeth will loosen material from the road and small particles are moved in one direction by the longitudinal blade members and large particles tend to be moved transversely thereto by the transverse blade members.

29. A road maintenance device having transversely disposed blades joined by a plurality of longitudinally disposed toothed blades producing selective action whereby large particles tend to be moved in one direction and small particles in another direction and excess road material is discharged over the top of the trailing transverse blade.

30. A road maintenance device having transversely disposed blades joined by a plurality of longitudinally disposed toothed blades to loosen up the road material and adapted to discharge excess loose road material over the top of the rearmost transverse blade.

31. In a road maintenance device, a plurality of units flexibly joined, each unit having substantially vertical teeth and longitudinal and transverse blade members whereby as the device moves over the road the teeth will loosen material from the road, and small particles are moved in one direction by the longitudinal blade members and large particles tend to be moved transversely thereto by the transverse blade members, and excess road material is discharged over the top of the rearmost transverse blade member.

32. A road file having a plurality of rigid, longitudinally extending backing members joined to form a device rigid in one direction and resiliently flexible in a direction at right angles thereto, and a plurality of aligned rasp-like road engaging projections carried by said members on one surface thereof, effective to remove road surface inequalities.

33. A road file having a plurality of rigid, longitudinally extending backing members joined to form a device rigid in one direction and resiliently flexible in a direction at an angle thereto and a plurality of aligned friction held teeth mounted in said members, effective to remove road surface inequalities.

34. A road file consisting of a backing member and road engaging teeth mounted therein, said member comprising a series of parallel, rigid, longitudinally extending units joined by resiliently flexible members at an angle thereto.

35. A road file consisting of a backing member and road engaging friction held teeth mounted therein, said member comprising a series of parallel, rigid, longitudinally extending units joined by resiliently flexible members at an angle thereto.

In testimony whereof I affix my signature.

CHARLES FRANKLIN GODDARD.